United States Patent [19]
Saito

[11] 3,982,826
[45] Sept. 28, 1976

[54] CINE CAMERA

[75] Inventor: Fumio Saito, Kawaguchi, Japan

[73] Assignee: Nihon Beru-Haueru Kabushiki Kaisha (Bell & Howell Japan, Ltd.), Higashimurayama, Japan

[22] Filed: Dec. 16, 1974

[21] Appl. No.: 533,373

[30] Foreign Application Priority Data
Dec. 17, 1973  Japan.............................. 48-142184

[52] U.S. Cl. ................................................. 352/14
[51] Int. Cl.² ........................................ G03B 31/00
[58] Field of Search ................. 352/14, 72; 226/44, 226/45

[56] References Cited
UNITED STATES PATENTS

| | | | |
|---|---|---|---|
| 3,025,750 | 3/1962 | Polan................................ | 352/72 X |
| 3,154,011 | 10/1964 | Gottscho........................... | 226/44 X |
| 3,244,469 | 4/1966 | Hennessey.......................... | 352/14 |

*Primary Examiner*—Monroe H. Hayes
*Attorney, Agent, or Firm*—John E. Peele, Jr.; Roger M. Fitz-Gerald; Gerald B. Epstein

[57] ABSTRACT

Disclosed is a motion picture camera adapted to expose silent film and sound film and having a control mechanism control the rate of film transport by intermittent and constant transporting devices to maintain a standard film transport speed. A high frequency differential transformer couples a power source and control circuitry including a rectifier circuit so that rectified output voltage of the transformer adjusts the intermittent mechanism responsive to the film loop size as detected by a film loop sensor arranged between the transporting devices. The output voltage varies from zero to some value when the loop sensor actuator is displaced from a position corresponding to an orientation when the film loop is of a standard size to modify the intermittent film transporting device to feed film at a rate to re-establish the film loop at the standard size. By changing a switch from sound to silent condition, the control circuit responsive to the loop sensor and the constant transporting device are disabled permitting the intermittent transporting device to be operated at the standard rate. Another standard rate can be selected for either sound or silent operating by actuation of a single switch.

3 Claims, 3 Drawing Figures

CINE CAMERA

This invention relates to a motion picture camera and particularly to a film transport control for a motion picture camera adapted to handle silent film and sound film of similar format.

In a motion picture camera for simultaneously recording sound along with a picture, film is transported intermittently by a shuttle through an exposure station in a known manner for a motion picture or cine camera. From the exposure station, the film is transported to and through the sound station of the camera at a constant speed by a capstan and pinch roller located near a recording head, which records sound on a record stripe of the film.

As the film is transported by the transporting devices of the intermittent film transporting mechanism and the constant film transporting mechanism, synchronization between picture and sound is sometimes lost since the film is transported at different speeds by the two transporting devices. To maintain picture-sound synchronization, a film loop is arranged between the intermittent and constant speed stations.

If the size of the loop remains constant, synchronization is maintained since the transport mechanisms are feeding film to and withdrawing film from the loop at the same rate. However, since the transport mechanisms are independent, the rate of film transport can vary whereby the size of the loop varies permitting synchronization to be lost. By detecting the size of the film loop, and adjusting one of the transport mechanisms relatively in response to the loop size variation, synchronization can be maintained. When the loop detected by the loop sensor is larger than a predetermined standard loop size, the rate of film transport is reduced through slowing down the speed of operation of the intermittent film transporting device. Alternatively, if the loop is detected as smaller than the standard loop, the intermittent film transporting device is caused to operate faster.

The use of a loop sensor and intermittent film transport control to maintain picture-sound synchronization is well known. Typically, in motion picture cameras for the home user, the film is transported at an average of 18 frames per second. Since slight variations in sound can be detected, the film is transported through the sound station as constant as possible at the preferred rate. However, to correct for slippage, stretching or shrinkage, the intermittent mechanism is varied. This variaton in the speed of the intermittent mechanism is accomplished by selecting a maximum speed, for example 20 fps, and a minimum speed, for instance 16 fps, at which the intermittent film transport device can be operated. When silent film is handled in some existing cameras, the motor for operating the intermittent film transporting device rotates at either its maximum or minimum speed as the constant film transporting device is stopped. Hence, another standard speed film transporting device is required to maintain the 18 fps rate. This requirement for a second control device is disadvantageous in causing the camera to be heavier, bulkier, and more expensive. To permit the camera to operate at the standard sound speed of 24 fps, yet another standard speed film transporting device is required causing the camera to be still bulkier and more expensive.

An object of the invention is to provide a motion picture camera control mechanism whereby the intermittent film transporting mechanism is operated at a standard rate for handling either sound or silent film. Further, at least another film transport rate is available without the addition of another complex, bulky and expensive mechanism drive and control device.

The motion picture camera according to this invention is adapted to expose silent film and sound film having a track on which sound can be recorded. The camera has an intermittent film transporting device at an exposure station and a constant film transporting device at a sound station. A control mechanism controls the rate of film transport to maintain a standard film transport speed. A high frequency differential transformer couples a power source and control circuitry so that output voltage of the transformer adjusts the rate of operation of the intermittent mechanism. The output voltage of the differential transformer is varied responsive to the film loop size as detected by a film loop sensor arranged between the transport devices to engage the film. As the loop changes from a standard size, a rectifier circuit, connected to the differential transformer for rectifying the output voltage from the transformer, energizes the intermittent film transporting device control circuit. The output voltage through the rectifier circuit from the differential transformer varies from zero to some value when the loop sensor actuator is displaced from a position corresponding to an orientation when the film loop is a standard sized loop. As the sensor is displaced from the position by variations in the loop size the output voltage of said rectifier circuit through said differential transformer is modified proportionally. Hence, the rate of operation of the intermittent film transporting device is modified to feed film at a rate to re-establish the film loop at the preferred standard size. The rate of operation of the intermittent film transporting device is increased when the sensor detects a decreasing film loop size, and is decreased when an increasing film loop size is detected. By changing a switch from sound to silent condition, the control circuit responsive to the sensor and the constant transport device are disabled permitting the intermittent transport device to be operated at the standard rate. Another standard rate can be selected for either sound or silent operating by interposing a resistance value through actuation of a single switch.

An object of the invention is to provide a motion picture camera control mechanism whereby the intermittent film transporting mechanism is operated at a standard rate for handling either sound or silent film. Further, at least another film transport rate is available without the addition of another complex, bulky and expensive mechanism drive and control device.

The above and other objects of the invention will be more fully understood from the following detailed description of preferred embodiments thereof taken in connection with the accompanying drawings.

Figure 1:
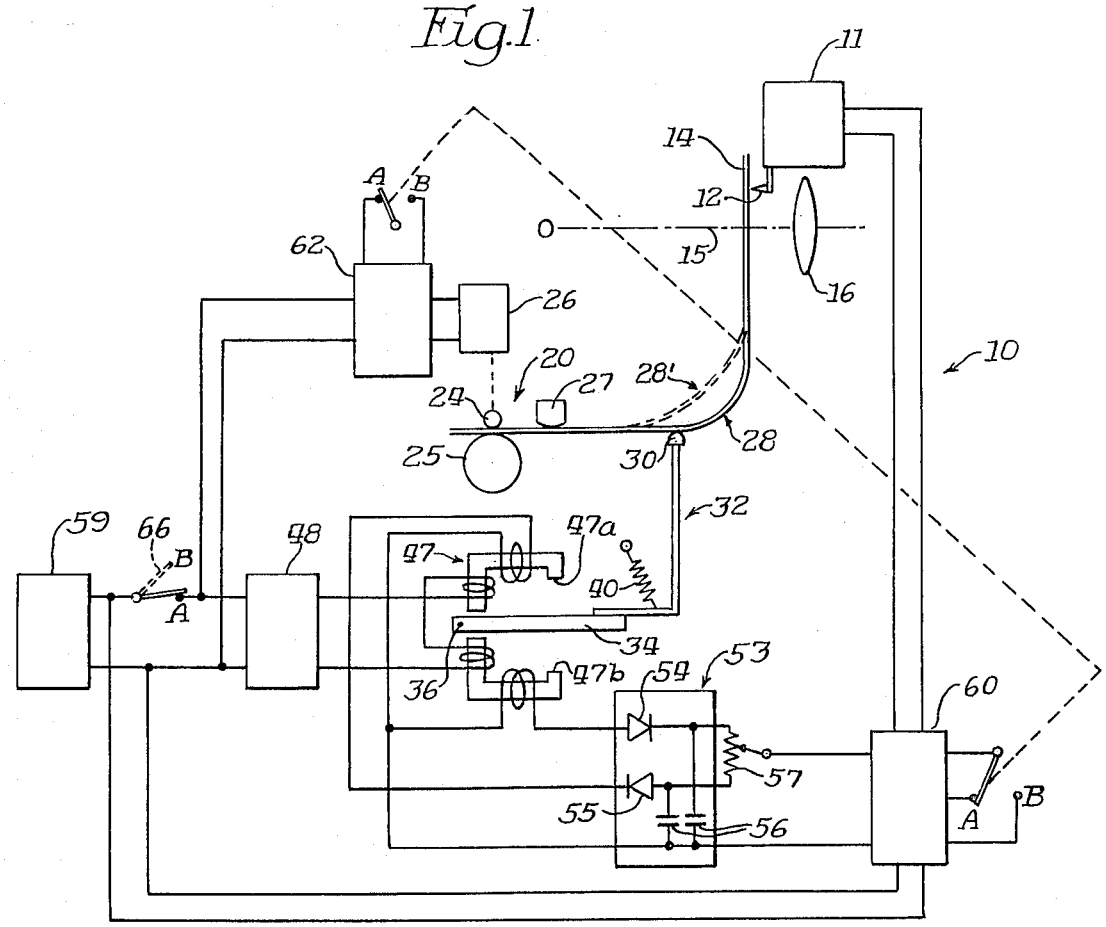
FIG. 1 is a schematic representation of a motion picture camera control circuit according to this invention including a preferred embodiment of a differential transformer.

Referring to the drawings, mechanisms and circuitry are shown for a motion picture camera generally referred to as 10. A motor 11 is provided for powering an intermittent film transporting device such as a shuttle 12. The intermittent transporting device transports film 14 intermittently through an exposure station represented by an optical axis 15 of an objective lens 16. In this preferred embodiment, the not shown film chamber of the camera is configured to accept either a silent film contained in a cassette, such as the currently available Super 8 cassettes, or a similar format sound film contained in a sound cassette of slightly different dimensions, also currently available.

At the sound station 20 of the camera 10, a capstan 24 is rotatably driven by a motor 26 for a constant film transporting device. A pinch roller 25 holds the film 14 against the capstan to be transported constantly and nonintermittently past a transducer shown as magnetic recording head 27. The transducer is aligned with a track of the sound film on which sound can be recorded.

Between the exposure station and the sound station, a film loop 28 is formed. When the intermittent transporting device and the constant transporting device operate at different rates, the loop becomes larger or smaller depending on whether more or less film is fed by the intermittent device to the constant device. As the film loop size changes, the position of a loop sensor 32 including a film engaging contact 30 is caused to change responsive thereto. The contact is fixed to a displaceable plate 34 which is mounted for rotation about a pivot axis 36. The contact is biased into continuous engagement with the film by a spring 40.

The pivoted plate 34, positionable by the contact 30, is arranged to move relative to cores 47a, 47b of a high frequency differential transformer 47, which is excited through a high frequency oscillator 48. The oscillator is energized through a rectifier circuit 53 which includes diodes 54, 55 and condensors 56. A variable resistor 57 enables adjustment for variations in the characteristics of the transformer 47, the coils, and other components such as the diodes and the condensers. The rectifier circuit 53 is energized by a power source 59 which is further connected to a control circuit 60 for the intermittent transporting device and the control circuit 62 for the constant transporting device.

For manual selection of principle camera operating conditions, a SILENT-SOUND change-over switch 66 is provided in the control circuit to cause the loop sensor and the constant transporting device to be de-energized whereby the intermittent transporting device is driven at a constant speed. A second change-over switch 68 is connected in the circuit between the power supply 59 and the control circuits 60, 62 to enable selection of a first film transport speed when the switch is at A, for example, 18 fps, or a second film tranport speed when the switch is at B, for example 24 fps.

When the camera is set for sound operation at a given transport rate, and is in operation, film is transported through the exposure station and through the sound station with the synchronization between the picture and sound maintained. As long as the standard transport speed is maintained, for example 18 fps, the film loop between the stations continuously engages the contact 30 which positions the plate 34 intermediate the cores 47a, 47b of the high frequency differential transformer 47. The film loop size remains constant so long as the intermittent transporting device 12 and the constant transporting device 24 continue to intermittent transporting device continue to transport filme at the same rate. The intermittent transporting device is caused to maintain the desired rate since the output through the rectifier circuit 53 from high frequency differential transformer 47 is zero, and this output is sent to the control circuit 60 for the intermittent transporting device.

If the size of the film loop 28 varies from the predetermined standard size because the intermittent transporting device 12 becomes slower or faster than the constant transporting device 24, the rotating plate 34 is repositioned relative to the differential transformer 47. The change in the relative position of the plate and the transformer causes the output through the rectifier circuit 53 to vary from zero. Hence, the control circuit for the intermittent transporting device is adjusted to alter the rate of film transport and the loop size to a rate whereby the image and sound are synchronized.

Figure 3:
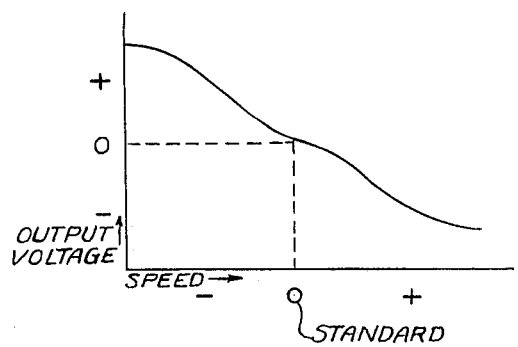
FIG. 3 is a graphed disclosure of output voltage characteristics.

Assuming that the intermittent transporting device becomes slower than the constant transporting device, the film loop becomes smaller as illustrated by the dotted line path 28, in FIG. 1. Since the contact 30 is urged by the spring 40 into continuous engagement with the film 14, the pivoted plate 34 is moved closer to one core of the high frequency differential transformer 47 and more remote from the other core. As the plate to core ratios change, the output voltage from the transformer to the rectifier circuit 53 is changed. Characteristics of the output voltage through the rectifier circuit from the differential transformer are shown in FIG. 3. This graph shows that the intermittent transporting device motor is rotated at a standard speed when the output voltage is zero (0). Further, the motor is rotated fast when the output voltage is minus (−) and is rotated slow when the voltage is plus (+). By reversal of the direction of diodes 56 in the rectifier circuit 53, the relationship of the characteristics of the output voltage and the rate of operation of the intermittent transporting device can be reversed.

Assuming the film loop to be diminishing, the voltage changes from zero or standard film transport speed to a minus (−) value, which causes the control circuit 60 to increase the speed of the intermittent transporting device. As a result of the increased speed of the intermittent transporting device, the film loop gradually rotated to the middle position between the cores of the differential transformer, causing the output voltage through the rectifier circuit from the differential transformer to return toward zero. As the output voltage again approaches zero, the intermittent transporting device approaches the standard film transport speed.

When the film is transported faster by the intermittent transporting device than the constant transporting device, the film loop becomes larger than the configuration shown in solid line in FIG. 1. The increased loop size displaces the plate toward the core by the movement of the contact. This change in the position of the plate changes the output voltage through the rectifier circuit from the high frequency differential transformer from zero (0) to plus (+). The output causes the control circuit to slow down the speed of the intermittent transporting device. Thereafter, the film loop becomes gradually smaller and returns to the predetermined standard size. As the loop size is reduced, the contact causes the transformer output voltage to return to zero again causing the speed of the intermittent transporting device to be stabilized at the standard film transport rate. Therefore, during photography with sound, synchronization is maintained between the sound and the picture by changing the speed of the intermittent transporting device relative to the standard speed of the constant transporting device.

Alternatively, for silent photography, the SOUND-SILENT change-over switch 66 is changed to the silent position B. Although described as a manually changeable switch in this preferred embodiment, the switch may be arranged in the film chamber to be changed automatically through the detection of the difference of the cassette type inserted in the camera. The cassette type detector may rely on the size of the cassette since certain dimensions of the silent cassette and certain dimensions of the sound cassette are different. Typically, the switch can be biased toward the silent condition and be moved to the sound condition by a larger dimension of the sound cassette.

As a silent cassette is loaded into the camera 10, the switch 66 is changed to the silent position in the circuit with the power source 59. The circuit path of power to the high frequency oscillator 48 is opened, thereby precluding energization of the high frequency differential transformer 47 and the motor 26 of the constant transporting device 24. Energy is available only for the control circuit 60 for the intermittent transporting device 12 so that only the motor of that device is powered and the film is transported intermittently. Since the voltage to control circuit 60 is the same as the output voltage through the rectifier circuit 53 from the differential amplifier when the standard loop is detected during sound photography, the intermittent transporting device is operated at a standard speed. Hence, the film is transported at the standard film transport speed without a special standard film speed control device for handling silent film as is required for known motion picture cameras capable of simultaneous sound recording.

The rate of film transport can be selected and maintained by positioning of the speed change-over switch 68 at either 18 fps (A) or 24 fps (B). By a change in the control circuits, the desired standard is selected whereby the rate of film transport is controlled at the selected rate. This rate is caused by the same output voltage being generated through the rectifier circuit as when the standard loop is zero during sound operation.

Figure 2:
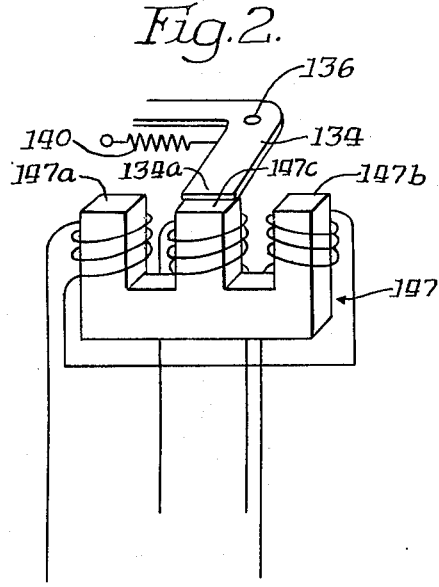
FIG. 2 is representation of a modified embodiment of a differential transformer.

In FIG. 2, a transformer 147, is shown which can be substituted for the differential transformer of FIG. 1. the plate 134 is mounted for rotation about an axis 136 to displace the end portion 134a from a standard rate position relative to a central core 147c toward one of the cores 147a, 147b, of the transformer. In this and the preferred embodiment, the plate 134 or 34 and the contact 30 may be attached independent or intergral components.

In the preferred embodiment, the driven exposure and sound components of the camera are powered by separate motors. However, the invention can be applied to a motion picture camera in which a single motor drives the constant transporting device, and through a transmission, the intermittent transporting device is driven. For controlling the intermittent transporting device, the transmission may consist of tapered pulleys, belts and the like. The contacting position between the belt and the tapered portion of a tapered pulley may be changed through the rotation of a component having a belt holding arm controlled through the voltage change of the differential transformer.

What we claim is:
1. A motion picture camera for exposing silent film and sound film having a track on which sound can be recorded, the silent film and the sound film being enclosed in distinguishable cassettes, the camera having an intermittent film transporting device for moving film through a sound station, the camera including means for controlling the rate of film transport to maintain a standard speed for film being transported through said camera comprising:
   a power source for energizing said transporting devices;
   a differential transformer connected in circuit with said power source to provide an output voltage;
   film loop sensor means arranged between said transport devices to detect the size of a film loop therebetween, and including actuator means movable relative to said differential transformer to vary same responsive to the film loop size so as to vary the output voltage from said transformer;
   a rectifier circuit connected to said differential transformer for rectifying the output voltage from said differential transformer as said voltage varies from zero when said actuator means is displaced from a position corresponding to an orientation with the film loop being a standard sized loop, said actuator means being displaceable from said position by variations in loop size thereby causing the output voltage of said rectifier circuit through said differential transformer to be modified proportionally;
   a control circuit connected to said intermittent film transporting device for varying said device responsive to variations in said rectified output voltage from said rectifier whereby the rate of operation of said intermittent film transporting device is modified to feed film at a rate to re-establish said film loop at said standard size, said differential transformer increasing the rate of operation of said intermittent film transporting device when said sensor detects a decreasing film loop size, and decreasing the rate of operation of said device when an increasing film loop size is detected;
   a high frequency oscillator connected in circuit between said power supply and said differential transformer providing an input voltage for exciting said differential transformer; and
   switch means actuated by said respective cassettes when said cassette is in said camera, said switch means deactivating electrically said high frequency oscillator and said constant film transporting device when the film cassette in the camera is detected as containing silent film.

2. Control means for an intermittent film transporting device of a motion picture camera as recited in claim 1 wherein said differential transformer includes at least two cores, and said actuator means is movable from an intermediate orientation to an orientation proximate one of said cores wherein said output voltage of said differential transformer is varied.

3. In a motion picture camera adapted to expose silent film and sound film having a track on which sound can be recorded, the camera having an intermittent film transporting device at an exposure station and a constant film transporting device at a sound station and a motor for driving variably said intermittent film transporting device, the invention comprising:
   control circuit means including a differential transformer for controlling the rate of operation of the motor of the intermittent film transporting device to cause the rate of film transport to be maintained at a standard speed;

film engaging means arranged proximate the film between said film transporting devices to detect the size of a film loop therebetween;

means actuated by said film engaging means relative to said differential transformer to vary the output voltage thereof as said loop size changes;

a rectifier circuit connected to said differential amplifier for rectifying the output voltage from said differential transformer, the output voltage through said rectifier circuit from said differential transformer varying from zero when said actuator means is displaced from a position corresponding to an orientation with the film loop being a standard sized loop, said actuator being displaceable from said position by variations in loop size thereby causing the output voltage of said rectifier circuit through said differential transformer to be modified proportionally, said means actuated by said film engaging means modifying said output voltage of said differential amplifier to increase the rate of operation of said intermittent film transporting device when said actuated means detects a decreasing film loop size, and to decrease the rate of operation of said device when an increasing film loop size is detected;

a high frequency oscillator connected to said power supply for exciting said differential transformer; and a switch means actuated by said respective cassettes when said cassette is in said camera, said switch means deactivating electrically said high frequency oscillator and said constant film transporting device when the film cassette in the camera is detected as containing silent film.

* * * * *